United States Patent
Song et al.

(10) Patent No.: US 9,577,737 B2
(45) Date of Patent: Feb. 21, 2017

(54) ANTENNA APPARATUS AND METHOD FOR BEAM FORMING THEREOF

(71) Applicant: Electronics and Telecommunications Research Institute, Daejeon (KR)

(72) Inventors: Jae Su Song, Daejeon (KR); Seok Seo, Daejeon (KR); Yun Hee Cho, Daejeon (KR); Seung Hwan Lee, Daejeon (KR); Seong Chul Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/061,218

(22) Filed: Mar. 4, 2016

(65) Prior Publication Data

US 2016/0315686 A1 Oct. 27, 2016

(30) Foreign Application Priority Data

Apr. 23, 2015 (KR) .................. 10-2015-0057318

(51) Int. Cl.
*H04B 7/08* (2006.01)
*H04B 7/04* (2006.01)
*H01Q 21/20* (2006.01)

(52) U.S. Cl.
CPC ............ *H04B 7/086* (2013.01); *H01Q 21/205* (2013.01); *H04B 7/0491* (2013.01)

(58) Field of Classification Search
CPC .......................... H04B 7/0617; H04B 7/0491
See application file for complete search history.

(56) References Cited

U.S. PATENT DOCUMENTS

| | | | |
|---|---|---|---|
| 2004/0204106 A1* | 10/2004 | Gurelli | H04B 7/0617 455/562.1 |
| 2006/0205356 A1 | 9/2006 | Laroia et al. | |
| 2009/0154587 A1 | 6/2009 | Cheong et al. | |
| 2013/0017797 A1 | 1/2013 | Ramasamy et al. | |
| 2013/0156141 A1 | 6/2013 | Eo et al. | |
| 2016/0105229 A1* | 4/2016 | Trainin | H04B 7/0617 370/329 |
| 2016/0285585 A1* | 9/2016 | Khandekar | H04L 1/0025 |

FOREIGN PATENT DOCUMENTS

KR 10-2014-0030316 3/2014

* cited by examiner

*Primary Examiner* — Tuan Pham
(74) *Attorney, Agent, or Firm* — Nelson Mullins Riley & Scarborough LLP (57) ABSTRACT

Provided is an antenna apparatus equipped with a single RF chain. The antenna apparatus includes: a combiner configured to divide omnidirectional space into N sectors to perform a sector sweep, combine a reception signal received via the single RF chain for each sector and calculate a gain of a composite signal; a comparator configured to determine a gain magnitude of the composite signal; and a controller configured to perform a beam-forming according to a comparison result of the gain magnitude of the comparator.

14 Claims, 8 Drawing Sheets

ANTENNA APPARATUS AND METHOD FOR BEAM FORMING THEREOF

CROSS-REFERENCE TO RELATED APPLICATION

This application claims the benefit of priority to Korean Patent Application No. 10-2015-0057318, filed on Apr. 23, 2015 in the Korean Intellectual Property Office, the disclosure of which is incorporated herein in its entirety by reference.

BACKGROUND OF THE INVENTION

Field of the Invention

The present disclosure relates to an antenna apparatus and a beam-forming method thereof, and more particularly, to a beam-forming technology in a single radio frequency (RF) based antenna.

Description of the Related Art

Due to the diffusion of smart devices and the increase of the multimedia services, the mobile service traffic bursts and, accordingly, an increase in the capacity of a communication system is required. Various methods for improving the performance of a wireless communication system including a beam-forming method are studied. Unlike an omni-antenna which radiates radio wave in all directions, the beam-forming method sets a different antenna gain depending on a direction to improve the performance of a wireless section.

If a beam-forming antenna is used, in a transmitter side, the radio wave with an enhanced antenna gain may be focused to radiate in a specific direction or a null may be formed not to radiate the radio wave in a specific direction so that the reception signal quality of a receiver becomes higher. In addition, in the receiver side, the radio wave may be selectively received depending on a reception direction to amplify a desired signal and reduce the interference so that the quality of wireless link may be enhanced.

The beam-forming method may obtain an effect such as a capacity increase due to spatial reuse, an interference cancellation between adjacent nodes that use the same frequency, the distance increase even though the same transmission power, and the like. In order to implement such a beam-forming function, a beam-forming antenna that can control the antenna gain according to a direction is required. In this case, a smart antenna which is configured of a plurality of antennas of an array form is usually used.

However, since such an array antenna should use multiple Radio Frequency (RF) chains, it has a disadvantage in that the volume is large and power consumption is also large, it is difficult to apply to a mobile terminal, and usually used to a base station. As a beam-forming antenna for applying to the mobile terminal, a single RF-based switched parasitic antenna (SPA) or an electronically steerable passive array radiator (ESPAR) antenna has been proposed.

The SPA or the ESPAR is configured of one active antenna and a plurality of passive antenna, and the active antenna is connected with an RF end and the plurality of passive antenna are connected with an on/off switch or a variable resistor element. By adjusting the switch of the passive antenna or the resistance value of a variable resistor, a directional beam is formed using a mutual coupling of the active antenna and the passive antenna to obtain a beam-forming effect. Since this single RF-based beam-forming antenna is configured as one RF, it is expected to be easily applicable to the mobile terminal as the power consumption is small and the size and the volume are small.

Meanwhile, in a multi-path wireless channel environment, various diversity methods are used to overcome the fading phenomena of a wireless channel. This diversity method is a method of receiving the same signal which performs an independent fading using N-array antennas and combining the signals through a signal processing method. In particular, a reception diversity method which is applied in a receiving end includes a selection combining (SC), a maximum ratio combining (MRC), an equal gain combining (EGC), and the like. The SC is a method of selecting and receiving one antenna which has the best signal quality (SINR) from among the N reception antennas. The MRC is a method of setting a reactance value for each reception antenna and adjusting a gain and a phase so that the reactance value may have a matched filter form with respect to a channel matrix to obtain an optimum SINR.

The EGC is a method of adjusting only the phase while fixing the gain to a constant in the MRC method. The SC has the lowest complexity, but also has the lowest performance. The MRC method has the best performance, but it is known that the EGC method has a performance close to the MRC in consideration of a complexity.

In the related art, in order to apply such a reception diversity, N array antennas are used to receive a signal and a RF chain is mounted for each antenna so that a receiver may be configured in an architecture which can process signals independently. Therefore, in the above described single RF based antenna structure, as the RF chain is a single, multi-path reception signals cannot be combined. Therefore, even if signals are received in multi-paths, a single path should be selected form the multi-paths to form a single beam in a corresponding direction and receive a signal.

Hence, conventionally, in the single RF based antenna structure, the beam-forming using a single beam is mainly applied, and the beam-forming using multi-beam is not used.

SUMMARY OF THE INVENTION

The present disclosure has been made in view of the above problems, and provides an antenna apparatus capable of implementing an antenna using a single RF chain that can achieve a multipath reception diversity effect which was able to be achieved only by configuring an array antenna using a number of RF chains.

In accordance with an aspect of the present disclosure, an antenna apparatus equipped with a single RF chain includes: a combiner configured to divide omnidirectional space into N sectors to perform a sector sweep, combine a reception signal received via the single RF chain for each sector and calculate a gain of a composite signal; a comparator configured to determine a gain magnitude of the composite signal; and a controller configured to perform a beam-forming according to a comparison result of the gain magnitude of the comparator. The combiner measures a strength of the reception signal for each sector and phase information, and calculates the gain of the composite signal. The comparator determines a sector having a maximum gain of the composite signal. The controller performs a beam-forming to receive or transmit a signal through the maximum gain of the composite signal. The combiner calculates the gain of the composite signal by using a characteristic that the gain of the composite signal is increased when a phase difference of the reception signal between the sectors is small and the gain of the composite signal is decreased when the phase difference of the reception signal is large. The combiner divides the omnidirectional space into N sectors and generates a sector beam having the same beam width as the sector to measure a reception signal for each sector. The comparator determines whether a gain condition of the following equation is satisfied with respect to the composite signal.

$$\cos\theta \geq \max\left(\frac{-|s1|}{2|s2|}, \frac{-|s2|}{2|s1|}\right), 0 \leq \theta < \pi \quad \text{[Equation 1]}$$

(s1, s2 denotes a magnitude of a reception signal received from each sector, and θ denotes a phase difference between two signals).

In accordance with another aspect of the present disclosure, a beam-forming method of an antenna apparatus equipped with a single RF chain includes: dividing omnidirectional space into N sectors and performing a sector sweep; measuring a reception signal for each sector; combining a signal for the reception signal for each sector and calculating a gain of a composite signal; determining a gain magnitude of the composite signal; and performing a beam-forming by selecting a sector according to the gain magnitude. Measuring a reception signal includes obtaining a strength of the reception signal for each sector and phase information. Calculating a gain of a composite signal includes calculating the gain of a composite signal by using the strength of the reception signal for each sector and the phase information. Measuring a reception signal includes generating a sector beam having the same beam width as each of the sector to measure a reception signal for each sector. Determining a gain magnitude of the composite signal comprises determining a sector having a maximum gain of the composite signal. Performing a beam-forming includes performing the beam-forming to receive or transmit a signal through the maximum gain of the composite signal. Calculating the gain of a composite signal includes calculating the gain of a composite signal by using a characteristic that the gain of the composite signal is increased when a phase difference of the reception signal between the sectors is small and the gain of the composite signal is decreased when the phase difference of the reception signal is large.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

The present disclosure discloses a technology which accomplishes a beam-forming function by applying a function of simultaneously receiving and combining multipath signals to a single RF-based antenna as in a reception diversity used in an array antenna.

The present disclosure describes a single RF based ESPAR antenna structure. However, the suggested beam-forming algorithm can be applied to various single RF-based beam-forming antennas which can implement the multi-beam. In addition, for clarity of illustration, it is described based on a 2D beam-forming. That is, it is assumed that the elevation angle is 90 degrees and the beam-forming is performed with respect to the azimuth angle. However, the method suggested in the present disclosure can be applied to a 3D beam-forming. The procedure suggested in this disclosure can be applied to both the transmission beam-forming and the reception beam-forming, but, in this case, it is described based on the reception beam-forming.

Hereinafter, embodiments of the present disclosure are described in detail with reference to FIG. 1 to FIG. 8.

Figure 1:
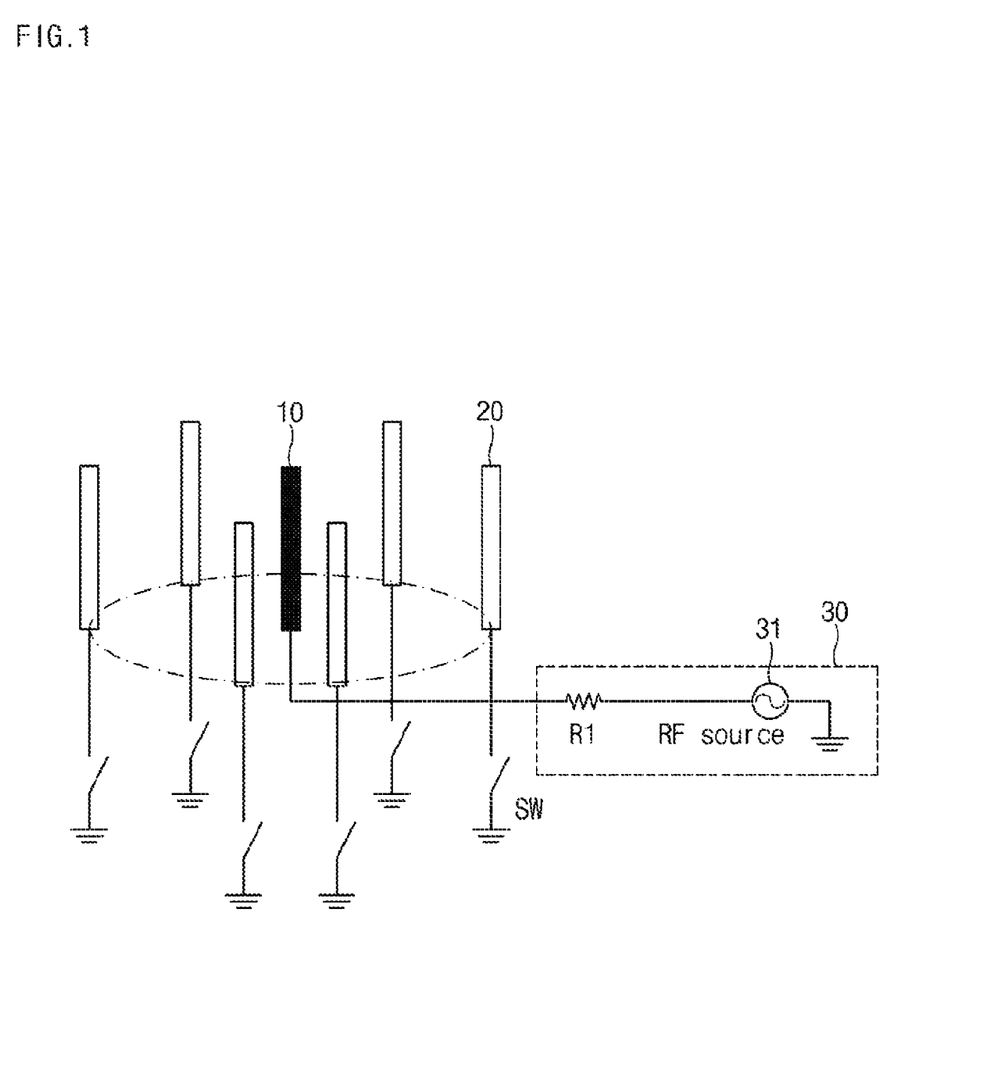
FIG. 1 is a diagram illustrating a configuration of a switched parasitic antenna (SPA) as a single RF-based beam-forming antenna according to an embodiment of the present disclosure.

FIG. 1 is a diagram illustrating a configuration of a SPA as a single RF-based beam-forming antenna according to an embodiment of the present disclosure.

The Switched Parasitic Antenna (SPA) which is a single RF-based beam-forming antenna according to an embodiment of the present disclosure may include a single active element 10, a plurality of parasitic elements 20, a RF chain 30 connected to the active element 10, and a plurality of switching elements SW which are connected respectively to the plurality of parasitic elements 20 to adjust a value of the parasitic element.

The active element 10 may be provided in the center of the antenna, and the plurality of parasitic elements 20 may be located around the active antenna 10.

The RF chain 30 may be modeled as an equivalent resistor R1 and an equivalent power source 31, and the resistor R1 and the power source 31 may be provided between the active element 10 and a ground voltage terminal.

The switching elements SW may be provided in the same number as the parasitic element 20 to adjust the value of each parasitic element 20. That is, if the reactance value of the switching element SW is increased, a corresponding parasitic element 20 may operate as a director. On the other hand, if the reactance value is decreased, a corresponding parasitic element 20 may operate as a reflector.

Thus, in the case of an antenna configured of N-parasitic elements 20, it may generate $2^N-1$ beam patterns.

Figure 2:
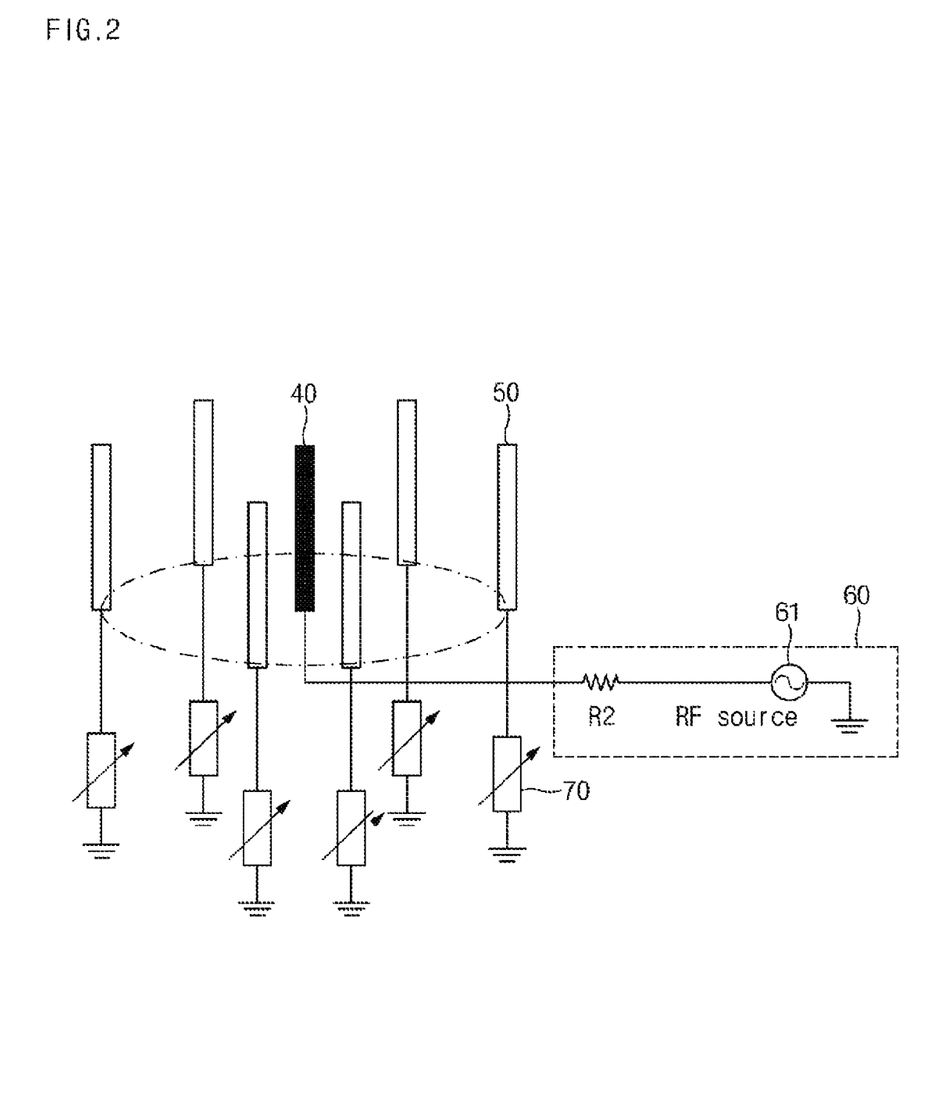
FIG. 2 is a diagram illustrating an example of an electronically steerable passive array radiator (ESPAR) antenna as a single RF-based beam-forming antenna according to an embodiment of the present disclosure.

FIG. 2 is a diagram illustrating an example of a ESPAR antenna as a single RF-based beam-forming antenna according to an embodiment of the present disclosure.

The electronically steerable passive array radiator (ESPAR) which is a single RF-based beam-forming antenna according to an embodiment of the present disclosure may include a single active element 40, a plurality of parasitic elements 50, a RF chain 60 connected to the active element 40, and a plurality of reactance elements 70 which are connected respectively to the plurality of parasitic elements 50 to adjust a value of the parasitic element.

The active element 40 may be provided in the center of the antenna, and the plurality of parasitic elements 50 may be located around the active antenna 40.

The RF chain 60 may be modeled as an equivalent resistor R2 and an equivalent power source 61, and the resistor R2 and the power source 61 may be provided between the active element 40 and a ground voltage terminal.

The reactance element 70 may be provided in the same number as the parasitic element 50 to adjust the value of each parasitic element 50. That is, if the reactance value of the switching element SW is increased, a corresponding parasitic element 50 may operate as a director. On the other hand, if the reactance value is decreased, a corresponding parasitic element 50 may operate as a reflector.

Therefore, a radiation pattern may be formed by the reactance value of such parasitic elements 50, and this pattern may become a beam pattern for beam-forming. Therefore, the beam-forming algorithm in the ESPAR antenna may be described as operations for searching an appropriate beam pattern and searching a reactance value for forming this beam pattern.

Figure 3:
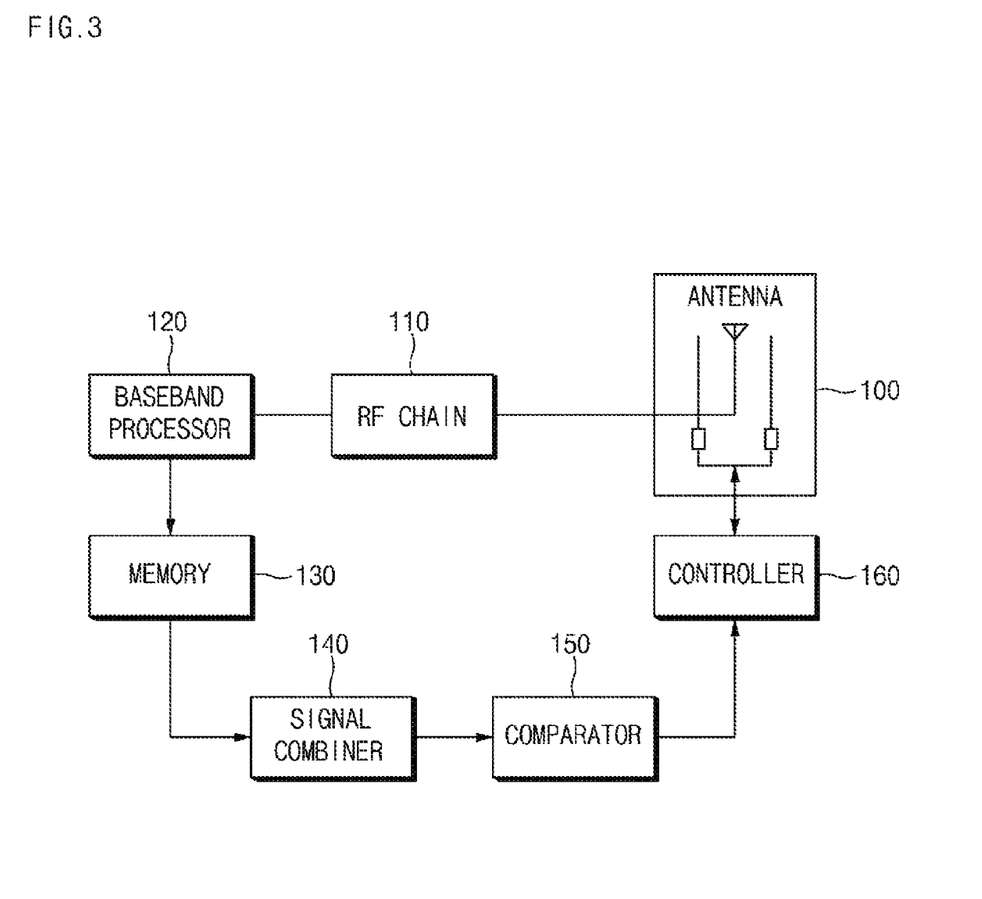
FIG. 3 is a diagram illustrating a configuration of an antenna apparatus according to an embodiment of the present disclosure.

FIG. 3 is a diagram illustrating a configuration of an antenna apparatus according to an embodiment of the present disclosure.

The antenna apparatus according to an embodiment of the present disclosure may include an antenna 100, a RF chain 110, a baseband processor 120, a memory 130, a signal combiner 140, a comparator 150, and a controller 160.

The antenna 100 may receive or transmit a signal. The RF chain 110 may convert a signal received from the antenna 100 into a digital signal.

The baseband processor 120 may perform a signal processing.

The memory 130 may store signal processing information.

Figure 5:
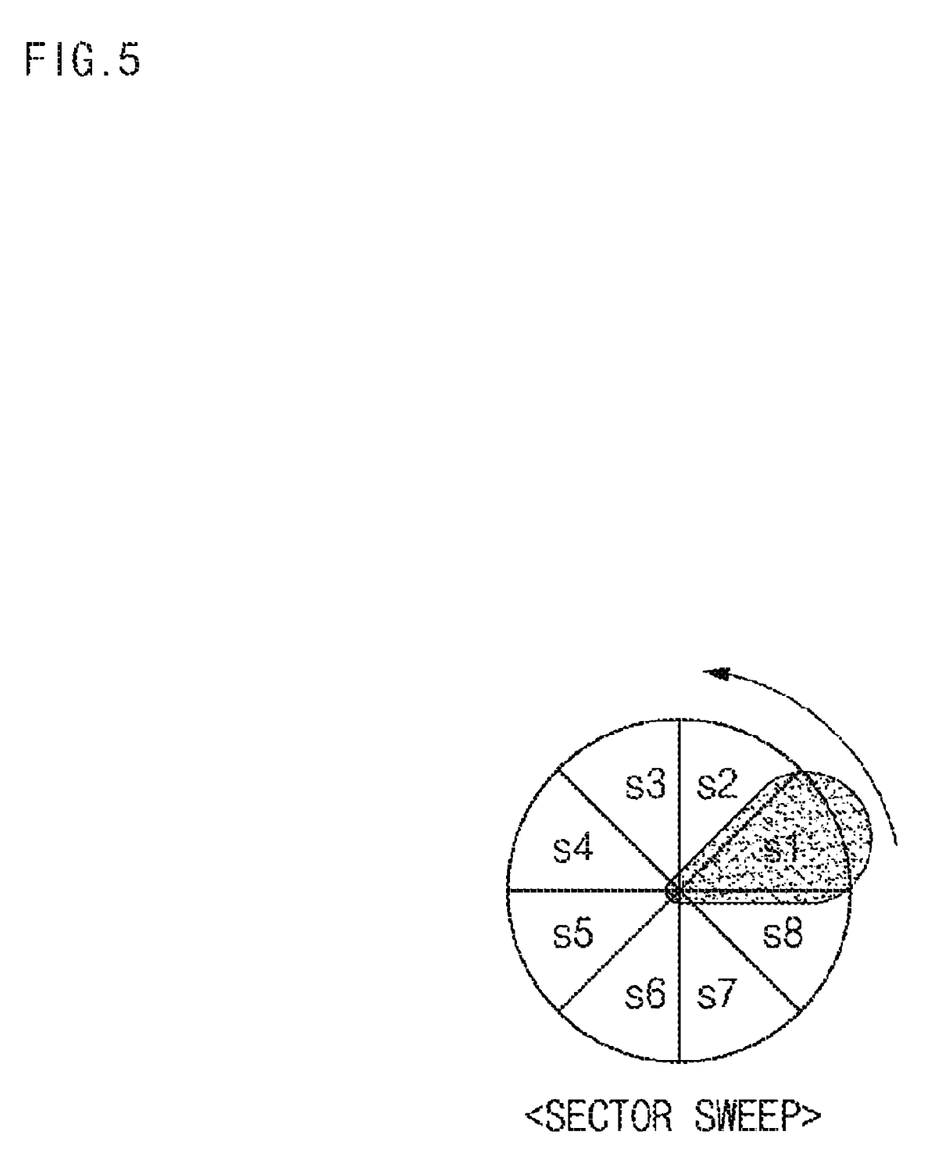
FIG. 5 is a diagram illustrating a sector sweep procedure according to an embodiment of the present disclosure.

The signal combiner 140 may divide omnidirectional space into N sectors to perform a sector sweep and obtain a reception signal strength and phase information for each sector. In this case, assuming that the omnidirectional space is divided into eight sectors as shown in FIG. 5, the sector sweep may be performed from a first sector to a eighth sector to measure the intensity and the phase of a signal. Thus, the signal combiner 140 may calculate a composite signal for a reception signal for each sector by using the obtained signal strength and phase information.

Figure 8:
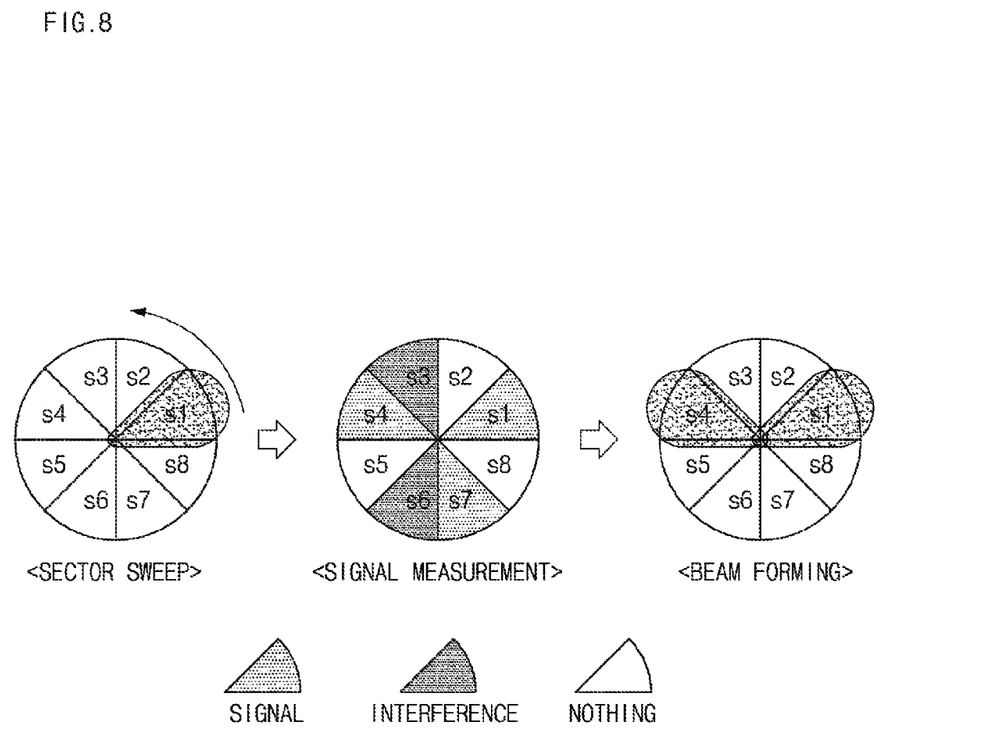
FIG. 8 is a diagram illustrating a sweep sector and beam-forming method according to an embodiment of the present disclosure.

FIG. 8 illustrates a procedure of measuring a multipath reception signal through a sector sweep in the case of being divided into eight sectors and checking a combining condition of the reception signal to perform a beam-forming to a sector in which a reception signal having the largest gain exists. In this case, the strength of signal and interference may be calculate by measuring the SINR and the RSSI of a reception signal through the sweep sector. FIG. 8 illustrates that multi-path signals may be received in S1, S4, S7 through the sweep sector.

The comparator 150 may determine a sector which can obtain the greatest gain among the composite signal. Referring to FIG. 8, it is shown that the beam forming is performed with a corresponding sector s1, s4 as it is determined that the highest gain may be obtained when s1 and s4 are combined by using a combining condition.

The controller 160 may perform the beam-forming so that a signal may be received in the sector determined by the comparator 150. That is, the controller 160 may perform the beam forming by controlling the reactance element or the switching element of the antenna 100 according to the result of the comparator 150. For example, if the gain of the combining of the signals received in the sector 1 and the sector 4 is high, the controller 160 may control the reactance element or the switching element so that the beam may be formed to the sector 1 and the sector 4.

Unlike a conventional method of simply comparing reception signal information for each sector obtained through the sector sweep from a single RF-based antenna and forming a single beam for the sector having the highest SINR, the present disclosure may form a multi-beam in such a manner that a reception signal for each sector is measured and the reception signals are combined and it is checked whether the composite signal satisfies a combining gain condition and the best reception signal may be obtained.

Figure 4:
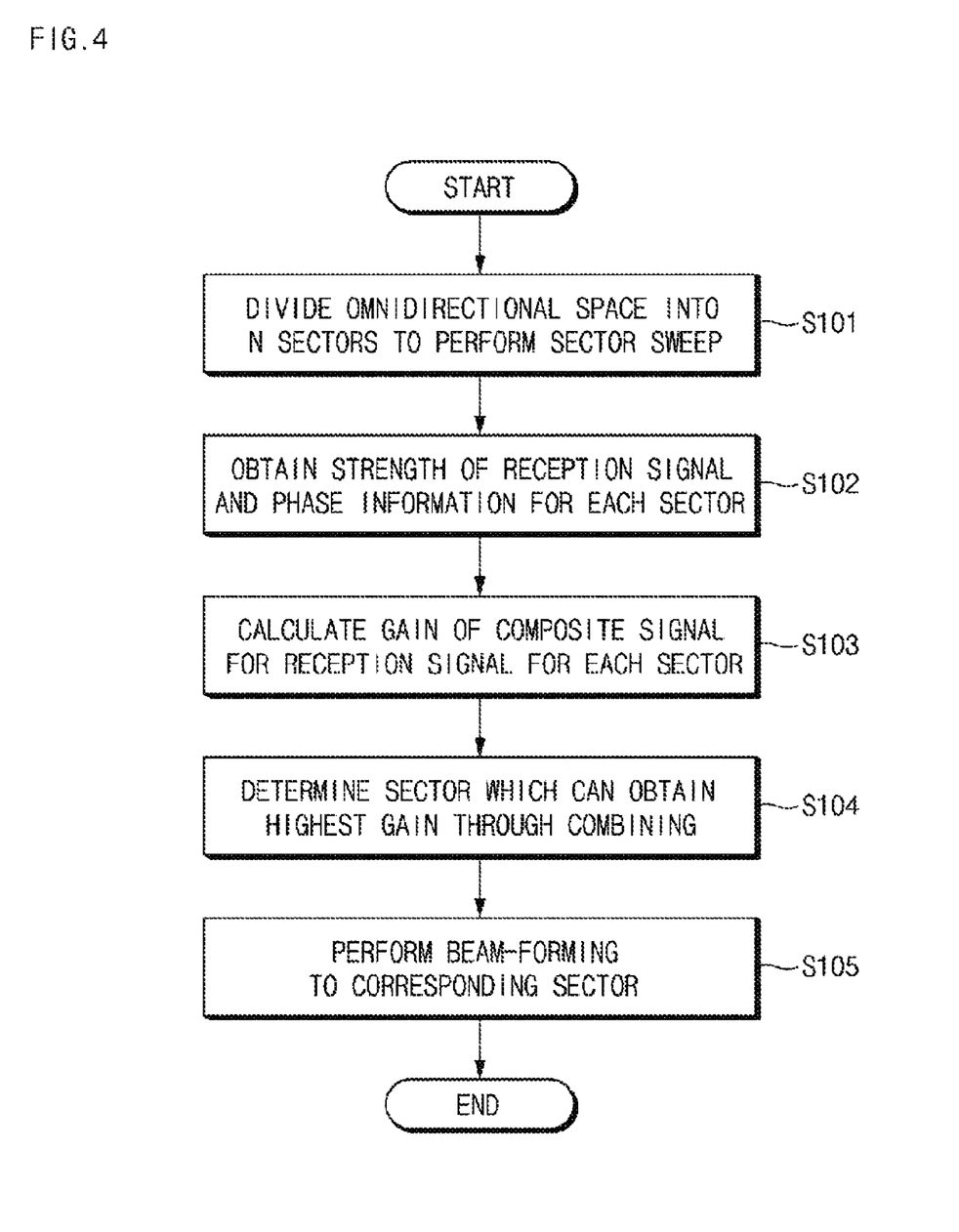
FIG. 4 is a flowchart illustrating an antenna beam-forming method according to an embodiment of the present disclosure.

Hereinafter, the antenna beam-forming method according to an embodiment of the present disclosure is described with reference to FIG. 4.

The signal combiner 140 may divide omnidirectional space into N sectors to perform a sector sweep (S101). Referring to FIG. 5, the sector sweep is performed sequentially for the N sectors.

That is, as shown in FIG. 5, in order to sector sweep, the entire radial direction may be divided into N sectors and generate a sector beam having the same beam width as the sector and measure the reception signal for each sector. At this time, the measuring of the reception signal may mean the measuring of the strength and phase of the reception signal. The direction of arrival (DOA) of a signal to be combined in a single RF-based antenna may be determined through the measured phase.

The signal combiner 140 may obtain the strength of the reception signal and phase information (azimuth) for each sector (S102).

The signal combiner 140 may calculate a composite signal for the reception signal for each sector by using the obtained signal strength and phase information (S103).

Then, the comparator 150 may determine a sector which can obtain the highest gain among the composite signal (S104).

The controller 160 may perform the beam-forming so that a signal may be received in the sector determined by the comparator 150 (S105).

As described above, the present disclosure may form a multi-beam in such a manner that multi-path signals are measured for omnidirectional space and it is determined that which signals should be combined from the strength of each signal and the phase information and signals which have a maximum gain at the time of combining may be combined and it is checked whether the composite signal satisfies a combining gain condition to obtain the best reception signal such that the best reception signal can be obtained.

That is, the beam-forming is performed in such a manner that the azimuth angle of each multipath reception signal may be obtained through the sector sweep and, in this case, it is checked when the largest signal intensity occurs in the case of being combined in a RF end and a beam is formed to sector into which a corresponding reception signal enters. Thus, when the phase difference between the multi-path reception signals satisfies a specific condition, a gain according to the signal combination may be obtained without controlling the gain and the phase for each reception signal, thereby increasing the quality of a wireless channel to increase a channel capacity.

Figure 6:
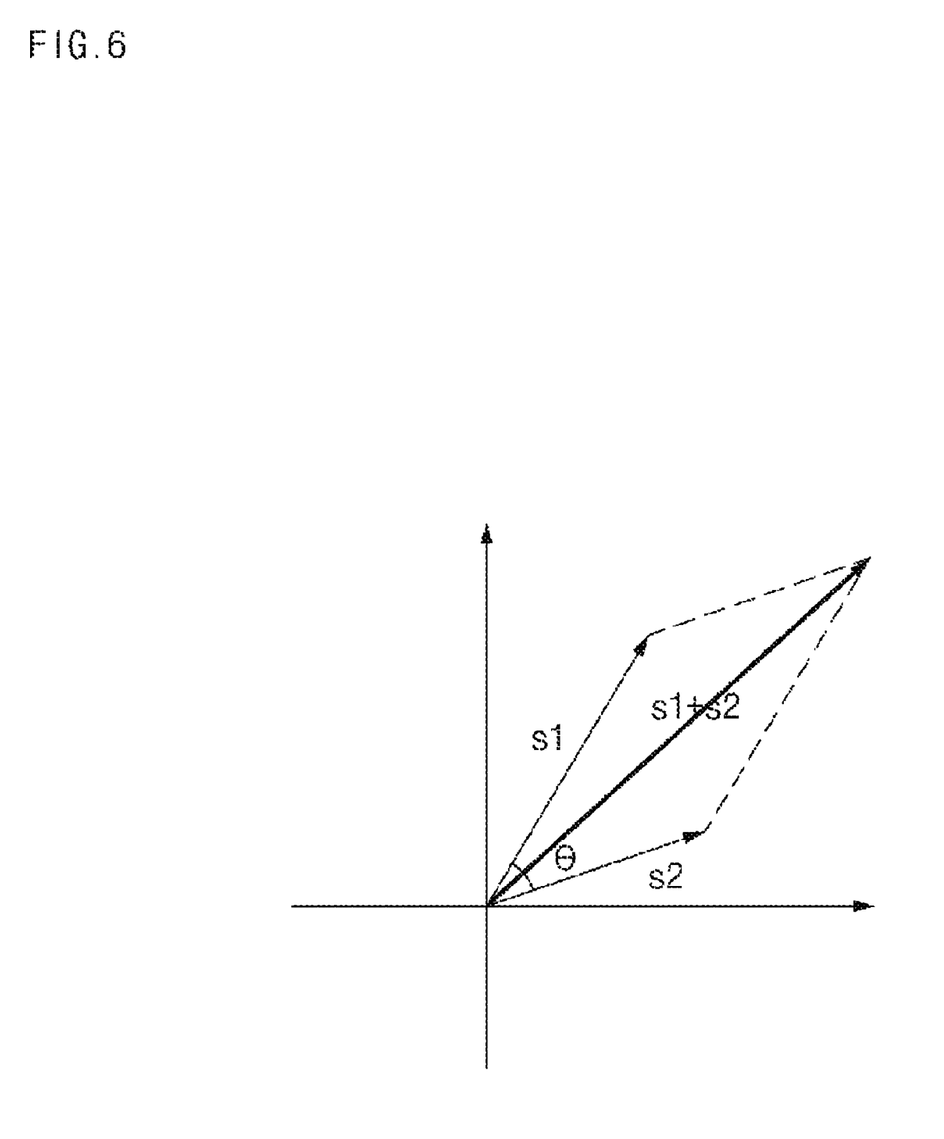
FIG. 6 is a diagram illustrating an example of an increase of a strength of composite signal in the case of combining multipath reception signals according to an embodiment of the present disclosure.
Figure 7:
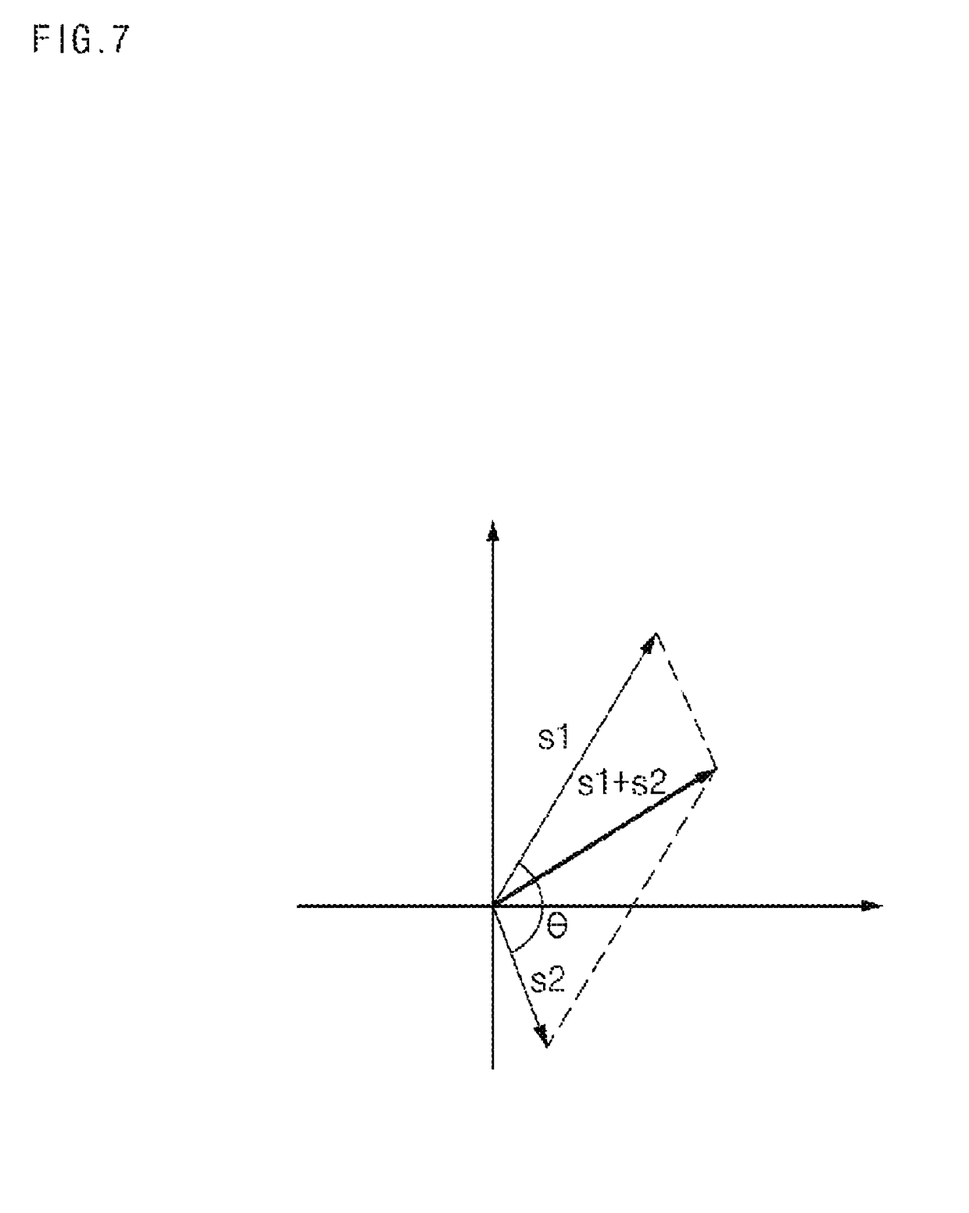
FIG. 7 is a diagram illustrating an example of a decrease of a strength of composite signal in the case of combining multipath reception signals according to an embodiment of the present disclosure.

Hereinafter, the change of the strength of composite signal in the case of combining multipath reception signals according to an embodiment of the present disclosure is illustrated with reference to FIG. 6 and FIG. 7.

In order to combine the signals received via multipath through a single RF-based antenna, the direction of arrival (DOA) should be determined to recognize the direction from which the signal is received. After determining the direction of the reception signal, the reactance value of the parasitic element can be adjusted so that the beam may be formed in a corresponding direction. However, unlike the conventional array antenna, since various signals are simply added in the RF end of the single RF-based antenna, the gain or the phase of each signal cannot be adjusted as in the related art.

Therefore, it should be previously checked whether gain exists when each signal is simply combined in the RF end. To this end, a vector for a combining of two signals is shown in FIG. 6 and FIG. 7. In order to obtain a gain when combining two signals s1 and s2, the magnitude of s1+s2 should be greater than the magnitude of existing signals (s1, s2). If the phase difference of the two signals is small as shown in FIG. 6, a probability of generation of gain is high. If the phase difference of the two signals is large as shown in FIG. 7, a probability of generation of gain is low. When two reception signals are s1 and s2, and the phase difference of the two signals is θ, the magnitude of s1+s2 may be obtained by a following trigonometric function equation.

$$|s1+s2|^2 = |s1|^2 + |s2|^2 - 2|s1||s2|\cos(\pi-\theta)$$ [Equation 1]

Therefore, the condition for obtaining a gain by combining the two signals is the following equation 2.

$$|s1|^2 + |s2|^2 - 2|s1||s2|\cos(\pi-\theta) \geq \max(|s1|^2, |s2|^2)$$ [Equation 2]

By solving Equation 2, it is possible to obtain a gain condition of composite signal as shown in the following equation 3.

$$\cos\theta \geq \max\left(\frac{-|s1|}{2|s2|}, \frac{-|s2|}{2|s1|}\right), 0 \leq \theta < \pi$$ [Equation 3]

The reception signal measurement may be performed with respect to all sectors, and if the reception signal is measured from two or more sectors among N sectors, a gain condition of composite signal may be checked by a condition given by above equation 3 and if the condition is satisfied, the beam-forming to form a multi-beam by corresponding sectors may be performed.

The present disclosure describes two multipath signals, but a combining may be performed in the same method with respect to three or more multipath signals. In the case of three multipath reception signals, a composite signal obtained when combing two signals may be obtained first and then three multipath reception signals may be obtained by combing the first obtained composite signal with the other signal. This finally obtained composite signal may be checked whether it satisfies the gain condition of the equation 3. If the multi-path signal is measured from among M sectors, the case of combining reception signals from 2 to M may be considered. Therefore, the number of signal combing may be calculated as shown in the following equation 4.

$$_MC_2 + {}_MC_3 + \ldots + {}_MC_M$$ [Equation 4]

As described above, the present disclosure may be designed to obtain a reception diversity effect through the beam forming in a single RF-based antenna, and may measure the multi-path signals for omnidirectional space, recognize specific signals to be combined from the strength of each signal and phase information, determine the sector which can obtain the highest gain by the combining, and perform beam forming to a corresponding sector.

The present disclosure provides a diversity effect by applying a function of simultaneously receiving and combining the multipath signal in the single RF-based antenna.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A antenna apparatus equipped with a single RF chain, the antenna apparatus comprising:
   a combiner configured to divide omnidirectional space into N sectors to perform a sector sweep, combine a reception signal received via the single RF chain for each sector and calculate a gain of a composite signal;
   a comparator configured to determine a gain magnitude of the composite signal; and
   a controller configured to perform a beam-forming according to a comparison result of the gain magnitude of the comparator.

2. The antenna apparatus of claim 1, wherein the combiner measures a strength of the reception signal for each sector and phase information, and calculates the gain of the composite signal.

3. The antenna apparatus of claim 1, wherein the comparator determines a sector having a maximum gain of the composite signal.

4. The antenna apparatus of claim 3, wherein the controller performs a beam-forming to receive or transmit a signal through the maximum gain of the composite signal.

5. The antenna apparatus of claim 1, wherein the combiner calculates the gain of the composite signal by using a characteristic that the gain of the composite signal is increased when a phase difference of the reception signal between the sectors is small and the gain of the composite signal is decreased when the phase difference of the reception signal is large.

6. The antenna apparatus of claim 1, wherein the combiner divides the omnidirectional space into N sectors and generates a sector beam having the same beam width as the sector to measure a reception signal for each sector.

7. The antenna apparatus of claim 1, $$\cos\theta \geq \max\left(\frac{-|s1|}{2|s2|}, \frac{-|s2|}{2|s1|}\right), 0 \leq \theta < \pi$$ [Equation 1]

(s1, s2 denotes a magnitude of a reception signal received from each sector, and θ denotes a phase difference between two signals), wherein the comparator determines whether a gain condition of the equation is satisfied with respect to the composite signal.

8. A beam-forming method of an antenna apparatus equipped with a single RF chain, the beam-forming method comprising:

dividing omnidirectional space into N sectors and performing a sector sweep;

measuring a reception signal for each sector;

combining a signal for the reception signal for each sector and calculating a gain of a composite signal;

determining a gain magnitude of the composite signal; and performing a beam-forming by selecting a sector according to the gain magnitude.

9. The beam-forming method of claim 8, wherein measuring a reception signal comprises obtaining a strength of the reception signal for each sector and phase information.

10. The beam-forming method of claim 9, wherein calculating a gain of a composite signal comprises calculating the gain of a composite signal by using the strength of the reception signal for each sector and the phase information.

11. The beam-forming method of claim 10, wherein measuring a reception signal comprises generating a sector beam having the same beam width as each of the sector to measure a reception signal for each sector.

12. The beam-forming method of claim 10, wherein determining a gain magnitude of the composite signal comprises determining a sector having a maximum gain of the composite signal.

13. The beam-forming method of claim 10, wherein performing a beam-forming comprises performing the beam-forming to receive or transmit a signal through the maximum gain of the composite signal.

14. The beam-forming method of claim 10, wherein calculating the gain of a composite signal comprises calculating the gain of a composite signal by using a characteristic that the gain of the composite signal is increased when a phase difference of the reception signal between the sectors is small and the gain of the composite signal is decreased when the phase difference of the reception signal is large.

* * * * *